(No Model.)

F. G. MYERS.
CAR WHEEL.

No. 384,924. Patented June 19, 1888.

Witnesses:
Chas. H. Kimball.
A. A. Clatch.

Inventor:
Frederick George Myers.

UNITED STATES PATENT OFFICE.

FREDERICK GEORGE MYERS, OF EAST BOSTON, MASSACHUSETTS.

CAR-WHEEL.

SPECIFICATION forming part of Letters Patent No. 384,924, dated June 19, 1888.

Application filed July 25, 1887. Serial No. 245,285. (No model.)

*To all whom it may concern:*

Be it known that I, FREDERICK GEORGE MYERS, residing at No. 211 Webster street, East Boston, in the county of Suffolk and State of Massachusetts, have invented a new and useful Improvement in Car and other Rail Wheels; and I do declare that the following is a full, clear, and exact description of the invention, which will enable any person skilled in the art to which it pertains to make and use the same.

My invention relates to car-wheels constructed to allow the outer periphery of either wheel on the same axle independent action of the other wheel for the purpose of traversing round curves, which I accomplish by having one wheel on each axle constructed with a loose or separate steel tire, which tire revolves and is retained on its wheel-body by means of spherical steel balls only, working in suitable grooves, as hereinafter described, pointed out in the claims, and illustrated in the accompanying drawings, in which—

Figure 1:
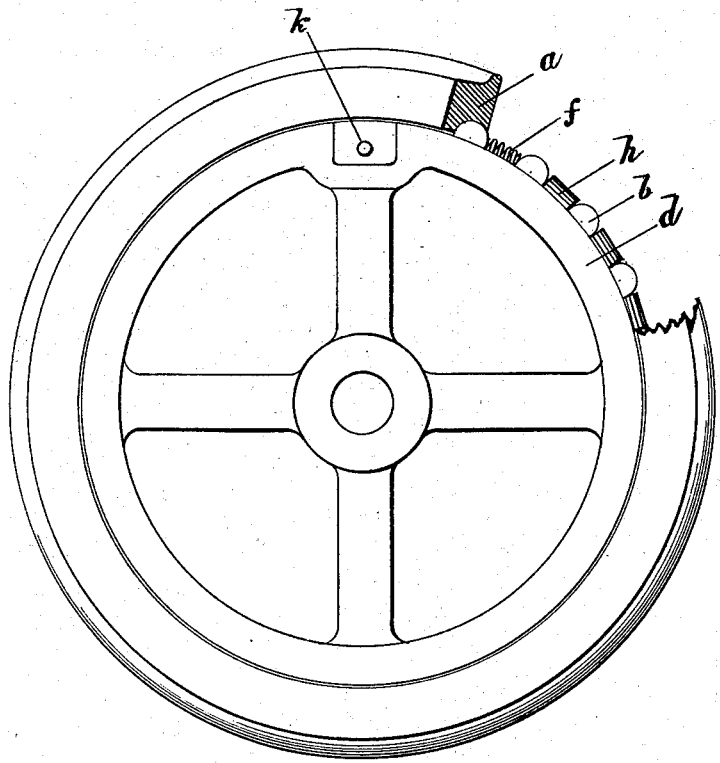
Figure 2:
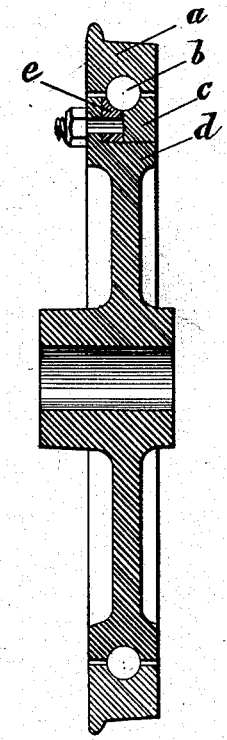

Figure 1 is a view of the outside face of my improved wheel with a portion of the steel tire cut away to show the relative positions of the spherical balls, distance-pieces, springs, and also filling-cavity, which are hereinafter referred to. Fig. 2 is a section of the wheel and tire through the center, showing the spherical-ball grooves, filling-space plate, bolt and nut, hereinafter referred to.

Similar letters refer to corresponding parts in both view and section.

I use the axle and one rigid wheel in its present existing form and relative position and substitute for the other wheel my improved wheel-body $d$, which is also rigid to the axle, and can be made of cast-iron, steel, malleable iron, or other desirable metal. This wheel-body $d$ is constructed with a cavity, $k$, which extends to a sufficient depth to be clear of the annular groove, and is for the purpose of inserting the spherical balls $b$ into their place, after which operation a separate plate, $e$, fills up the cavity as far as the center line of the spherical ball $b$, the remaining cavity-space being filled up by the block $c$, which is provided with a stud or bolt, which passes through the plate $e$ and cavity-bottom and is compactly held by a nut at the back side of the wheel-body. This wheel-body is provided with one or more suitable grooves in its outer periphery for the spherical balls to work in. Revolving on this wheel-body $d$ is a steel tire, $a$, the inner face of which is grooved, corresponding with the outer periphery of the wheel-body $d$, so that when placed together they form the annular space in which the friction-retaining spherical balls $b$ work.

Between each ball $b$ a distance-piece, $h$, is used, preferably of wood, with leather ends, and at certain intervals a coil-spring, $f$, for the purpose of taking up any lateral sound and wear. Space is also left between the steel tire $a$ and wheel-body $d$ to allow for entrance and expulsion of dirt, also facial-contact wear, dust-guards being deemed unnecessary and optional.

The operation of my improved wheel allows the loose tire on the wheel-body and rigid ordinary wheel on the same axle independent action of each other. Consequently either can revolve faster when traversing curves, (necessitated by the outer rail being longer than the inner one,) thus relieving the axle-strain, motive power, and lessening wear to wheels and rails, and allowing the usual rolling action on a straight track. The use of spherical friction-retaining balls dispenses with all side retaining-plates to the tires. Consequently there is no side friction when pressing against the outer rail. There is no undue strain on any given point, and I dispense with the use of plates, bolts, nuts, &c., which are liable to get out of order. I also secure perfect rigidity of arc from rail to rail through the axle under all conditions of wear.

Having thus described my invention, what I claim, and desire to secure by Letters Patent, is—

1. A car-wheel having a loose tire retained and rotating upon the body of the wheel by means of sperical friction-balls, substantially as hereinbefore described, and for the purpose set forth.

2. A wheel-body having the cavity $k$, in combination with the plate $e$ and filling-block $c$, provided with the stud or bolt and nut, substantially as described.

3. A wheel-body and tire each provided with the annular groove, in combination with the friction-balls, distance-pieces, and springs, substantially as described.

FREDERICK GEORGE MYERS.

Witnesses:
 CHAS. H. KIMBALL,
 A. J. HATCH.